(12) United States Patent  (10) Patent No.: US 9,496,898 B2
Sabiani et al.  (45) Date of Patent: Nov. 15, 2016

(54) ARCHITECTURE FOR INTERFACING BETWEEN DIGITAL AND RADIO SUBSYSTEMS

(71) Applicant: THALES, Courbevoie (FR)

(72) Inventors: Jean-Julien Sabiani, Gennevilliers (FR); Cyril Voillequin, Gennevilliers (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/780,546

(22) PCT Filed: Mar. 27, 2014

(86) PCT No.: PCT/EP2014/056193
§ 371 (c)(1),
(2) Date: Sep. 27, 2015

(87) PCT Pub. No.: WO2014/154821
PCT Pub. Date: Oct. 2, 2014

(65) Prior Publication Data
US 2016/0056844 A1  Feb. 25, 2016

(30) Foreign Application Priority Data
Mar. 27, 2013  (FR) ...................................... 13 00710

(51) Int. Cl.
*H04B 1/00*  (2006.01)
*H04B 1/40*  (2015.01)
(Continued)

(52) U.S. Cl.
CPC .............. *H04B 1/0003* (2013.01); *H04B 1/40* (2013.01); *H04J 3/0685* (2013.01); *H04L 25/02* (2013.01); *H04L 27/0002* (2013.01); *H04J 3/0682* (2013.01)

(58) Field of Classification Search
CPC ...................... H04B 1/0003; H04B 1/40; H04J 3/0685; H04J 3/0682; H04L 25/02; H04L 27/0002
See application file for complete search history.

(56) References Cited

U.S. PATENT DOCUMENTS 8,085,754 B1 * 12/2011 Khlat ................... H04B 1/7073
370/338
2007/0281743 A1  12/2007 Palin et al.
(Continued)

FOREIGN PATENT DOCUMENTS

EP  0 911 993 A2  4/1999
EP  2 107 684 A1  10/2009
(Continued)

*Primary Examiner* — Dac Ha
(74) *Attorney, Agent, or Firm* — Baker & Hostetler LLP

(57) ABSTRACT

An architecture defining functional and technical perimeters to be complied with between two subsystems termed "baseband" and "radio frequency," and to a generic physical interconnection pattern between baseband and radio frequency, which, under nominal operation, does not require physical signals specific to the design of one or other of the baseband and radio frequency subsystems, and which is not associated with a particular physical implementation solution. The architecture uses an exchange protocol which travels over the generic interface, meeting the real-time constraints of the transmission systems and using a time stamped messaging system.

12 Claims, 11 Drawing Sheets

(51) Int. Cl.
*H04L 25/02* (2006.01)
*H04L 27/00* (2006.01)
*H04J 3/06* (2006.01)

(56) References Cited

U.S. PATENT DOCUMENTS

2013/0080495 A1* 3/2013 Staszewski ......... G06F 9/30032
708/670
2013/0287070 A1* 10/2013 Lee ..................... H04B 1/0003
375/219

FOREIGN PATENT DOCUMENTS

| EP | 2 154 788 A2 | 2/2010 |
|----|--------------|--------|
| WO | 2008/142149 A1 | 11/2008 |
| WO | 2008/154232 A1 | 12/2008 |

* cited by examiner

ARCHITECTURE FOR INTERFACING BETWEEN DIGITAL AND RADIO SUBSYSTEMS

CROSS-REFERENCE TO RELATED APPLICATIONS

This application is a National Stage of International patent application PCT/EP2014/056193, filed on Mar. 27, 2014, which claims priority to foreign French patent application No. FR 1300710, filed on Mar. 27, 2013, the disclosures of which are incorporated by reference in their entirety.

FIELD OF THE INVENTION

The subject of the invention concerns an interface architecture for digital radio frequency transmission equipment, that is to say an equipment using a digital subsystem coupled to a radio frequency subsystem.

It can be used for any type of transmission (modem, radar, navigation, etc.), all frequency bands (VLF, high frequency HF, very high frequency VHF, ultra high frequency or UHF, etc.). It is used for all types of equipment: portable, aeronautical, vehicle, etc. It is used more particularly for software radio equipment, better known by the term "software defined radio" (SDR).

BACKGROUND

Interconnection patterns between a digital baseband module and a radio module are specific to each industrialist and/or are dedicated to a given application. The baseband subsystem (BB) must have precise knowledge of the design and the real-time behavior of the radio frequency equipment (RF) with which it is associated. The baseband and radio frequency subsystems have a high level of interdependence. In fact, they are not or not very reusable. Moreover, the architectures are not modular.

The known architectures of the applicant are based on the use of analog signals on intermediate frequency IF or otherwise and/or specific digital signals and/or a set of discrete signals, bearing all or some of the real-time and functional constraints related to the design of the radio subsystem (trigger, specific timings, characteristic frequencies, clock, command signals, etc.). The known systems and architectures of the applicant are not modular and do not allow themselves to be easily evolved. Due to the high level of coupling between the BB and RF subsystems of the prior art, the existing structures do not provide opportunities for interchangeability or evolutions of one or the other of the subsystems without resorting to a resumption of developments.

The functional and behavioral characteristics, the capabilities, the performances and notably the real-time sequencing to be fulfill that are associated with the RF subsystem need to be taken into account in a precise manner in the baseband BB subsystem. Even in the most accomplished prior architectures, the exchange mechanisms between the BB and RF are synchronous, which imposes constraints on the hardware and software design of the BB; control over real time must be implemented finely in the BB.

The patent EP 2 107 684 describes an interface architecture according to which the processing times for the various commands of the radio module must be known from baseband and integrated into the operations of the baseband application that is executed on it.

SUMMARY OF THE INVENTION

To offset this characteristic that makes the Baseband/Baseband application/Radio frequency subsystems dependent, the principle of the present invention consists notably in providing a better level of independence among these subsystems, notably by hiding for the baseband and its application the need to know the intrinsic events of the radio module, the number of timings and their associated precise values. It is only required to comply with the use of functional commands by observing a single anticipation time for any exchange with the radio module.

One of the goals of the present invention is to define an architecture based on a breakdown of functional and technical perimeters to be complied with by the two baseband BB and radio frequency RF subsystems, a generic physical interconnection pattern between baseband and radio frequency that does not require specific physical signals linked to the design of one or other of the BB and RF subsystems, and that is not associated with a particular physical implementation solution. The architecture according to the invention uses an exchange protocol of time stamped messages that move over an interface that is nonspecific and therefore generic, complying with the real time constraints of the transmission systems.

The propagation of the messages is deterministic so as to ensure, notably, the synchronization between the two clock domains BB and RF.

As such, the generic link verifies the following features:
absence of dedicated physical signals having a direct link to the knowledge of the hardware design of one or the other of the subsystems BB or RF (with the exception of the interface controller),
the link does not incorporate discrete physical command signals corresponding to the control of a specific element that is present on the BB or the RF,
the signals do not comply with a frequency, a particular voltage that would be induced by the design of one of the two BB or RF subsystems (with the exception of the interface controller).

The subject of the invention concerns an interface architecture between a first digital baseband subsystem BB and at least one second radio subsystem RF that is connected by means of a link L, the architecture is characterized by the fact that it has at least the following elements:
at the digital BB subsystem level,
a signal processing application module, the operation of which is based on the use of a time $H_B$, said application module is adapted for generate and/or receive messages MSG(H, data) comprising an implementation time H and data, parameters or IQ samples, which are associated with the operation of the second radio subsystem, and works with a generic interface controller,
at the radio subsystem comprising a digital part and an analog part,
an interface controller linked to a module for processing the messages MSG(H, data), said module for processing the messages is adapted to operate on the basis of a time $H_R$, and transmitting control signals to the digital part and the analog part of the radio subsystem, transmitting and/or receiving messages to/from baseband,
a memory for storing the messages awaiting processing, a message anticipation table, a module adapted to compare a time of message implementation with a time that is necessary for its execution and to provide a signal for triggering the processing of the message for the message processing module generating control/command signals to said digital/analog parts, and a time-setting module, said interface controllers are adapted to synchronize the time of the digital subsystem and the time of the radio subsystem, said link L is adapted to drive the time stamped messages between a radio subsystem and a digital BB subsystem. The time for routing the messages is deterministic.

By way of example, the BB module has a simplified functional and temporal view of the radio subsystem, the second radio subsystem RF is seen from the BB module and from the BB application as having a latency, the delay and processing time from the application BB to the antenna plane, which is single whatever the command. The RF module is seen from the BB module and from the application BB as providing advanced commands that do not require, at the BB, the execution of a series of microcommands in order to perform a fundamental function of the RF module (transmission, reception, etc.). The execution of this series of microcommands is implemented autonomously by the RF module itself.

The architecture has, by way of example, a restitution chain and an acquisition chain at the digital BB subsystem or at the analog RF subsystem.

The interface controller of the digital subsystem is, by way of example, adapted to generate messages having the following format: a field address, followed by an implementation time of a message, the type of message, the size of the data and a field for the data.

The radio subsystem may be a radio frequency subsystem RF.

The invention also concerns a method for guaranteeing the independence of a baseband application BB in relation to a radio module RF, implemented in the aforementioned architecture, characterized in that it has the following steps: controlling one or more radio subsystems comprising at least one interface controller, from a digital BB subsystem comprising an interface controller and an application TS, and the method is characterized in that it involves at least the processing of the following actions:

configure the radio submodule(s) and determine the specific anticipation time with which the application TS has to operate, synchronize the times between the digital BB subsystem and the radio subsystem(s), transmit, from the baseband subsystem and to a radio subsystem, messages MSG(H, data) having the parameters indicating to the radio submodule the processing operations to be performed, store the message in memory and, as soon as the duration of memory storage has finished, execute the message by configuring the radio sub-module and by activating the content of the data of the message for the operation of the antenna.

The method advantageously allows the hardware and functional abstraction of the radio submodule RF to be guaranteed for the application in baseband, making it possible to guarantee the independence of the baseband application in relation to the radio module or submodule.

According to a variant embodiment, on startup, the method involves at least the following steps:

a first phase for determining the delay of the interface between a radio subsystem and the BB subsystem, a second phase of synchronization of the time $H_R$ of a radio subsystem RF and the time $H_B$ of the BB subsystem, a third phase, in which the BB subsystem retrieves the minimum anticipation time used by the application TS for transmitting the time stamped messages from the BB subsystem to the radio subsystem, a fourth phase, in which the latency between the BB subsystem and the radio RF is used to deduce the single minimum anticipation time that will be used by the BB subsystem to control the RF.

The method may have at least the following steps:

a first phase, in which a transmission/reception loop is implemented by executing the following steps, at the time t=H, the interface controller BB sends a message MSG(request ($\tau$)) to the interface controller RF in order to retrieve the time required by the RF to produce a return message MSG($\tau$) that contains the transit time $D_I$ for replying, $\tau$ is the time for producing the message, the departure t and arrival t'=H+2$D_I$+$\tau$ times of the loop are measured at the BB subsystem in order to determine the transit time $D_I$, a second phase, in which the BB subsystem transmits, at the time $H_B$, a message MSG(time set [$H_B$+$D_I$]) to the RF subsystem containing the time $H_B$ increased by the transit time $D_I$, or the time $H_R$ increased by the transit time $D_I$, the necessary duration for routing the message to the time module of the radio subsystem, a third phase, in which the application TS sends, with a message MSG(Config RF), all of the configurations and/or configuration information that is/are necessary for its operation, notably the digital configuration and the analog configuration, in return, the radio subsystem returns the message MSG ($D_R$), the anticipation duration $D_R$ necessary for processing the messages, the BB interface controller then accumulates the anticipation durations $D_A$=$D_I$+$D_R$, and provides this minimum anticipation value $D_A$ for the application TS in order to converse with the RF.

At transmission, a message of IQ samples that is created by the BB comprises, by way of example, the date indicating the instant of output of the first sample on the antenna plane, said date being deduced from the real-time time $H_B$ of the BB subsystem. The chronological generation of the time stamped commands by the application TS is not necessary to guarantee that they are implemented on the date required on the antenna plane.

At reception, a message of IQ samples that is created by the radio subsystem can comprise the date indicating the instant of consideration of the first sample on the antenna plane, said date being deduced from the real-time time $H_R$ of the radio subsystem. The chronological generation of the time stamped commands is not necessary to guarantee that they are implemented on the date required on the antenna plane.

A message for configuring the radio subsystem, which message is created by the BB, comprises, by way of example, the date indicating the instant at which the radio subsystem needs to be configured for the incoming/outgoing samples, and the date is deduced from $H_B$ for the BB subsystem. The chronological generation of the time stamped commands is not necessary to guarantee that they are implemented on the date required on the antenna plane.

A control or monitoring message created by the RF comprises, by way of example, the date indicating the instant at which the measurements are taken, and the date is deduced from the real-time time $H_R$ of the radio subsystem.

For example, the method is implemented in a radio frequency subsystem RF.

The method according to the invention can also be used:
on a system embedding the BB and the RF within one and the same housing,
on a system in which the BB and the RF are accommodated in two housings that are physically separate and remote.

It can also be used in one or more of the following applications: radar system, tactical (portable radio and vehicle radio), aeronautical and naval transmission system, goniometry system, sensor/reflector system, jamming system, infrastructure transmission system, instrumentation equipment, test bench, navigation system, and spectrum monitoring system.

BRIEF DESCRIPTION OF THE DRAWINGS

Other features and advantages of the device according to the invention will become better apparent on reading the description that follows for an exemplary embodiment that is provided by way of illustration and is in no way limiting, with the appended figures, in which.

DETAILED DESCRIPTION

Figure 1:
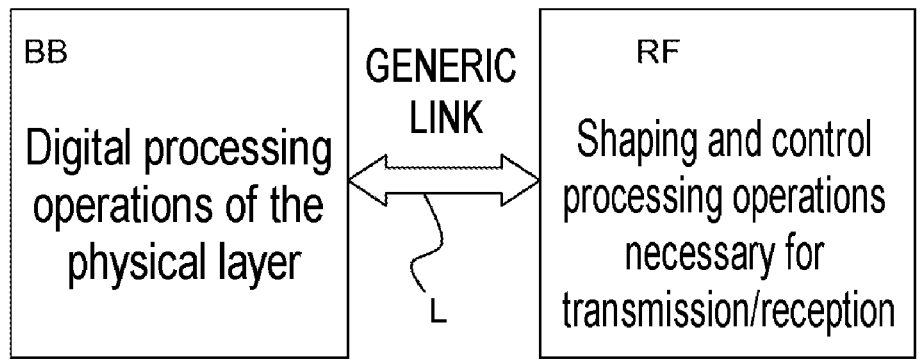
FIG. 1 shows a diagram representing the functional architecture according to the invention, FIG. 2 uses a timing diagram to show a comparison between the synchronization constraints for physical events between BB and RF in a system according to the prior art and the logical substitution mechanism according to the invention.

FIG. 1 schematically shows the concept on which the architecture according to the invention is based. A first baseband subsystem BB, 1, is interconnected and converses with a second, radio frequency, subsystem RF, 2, by means of a generic link L that is based on the use of time stamped logic messages. The BB module has a simplified functional and temporal view of the radio module:

the RF module is seen from the baseband subsystem BB (or BB module) and from a baseband Application BB as having a single latency (delay and processing time for the Application BB to the antenna plane) whatever the command, the RF module is seen from the BB module and from the Application BB as providing advanced commands that do not require the execution of a series of microcommands at the BB in order to implement a fundamental function of the RF module (transmission, reception, etc.). The execution of this series of microcommands is implemented autonomously by the RF module itself.

The baseband subsystem BB incorporates the digital processing operations that implement the physical layer of a digital radio system.

The radio frequency subsystem RF is adapted to implement all of the real-time digital and analog shaping and control processing operations that are necessary for correct transmission or reception of the radio signal.

The generic link L is adapted for implement the interconnection between the BB module and the RF module without involving specific physical signals linked to the design of one or other of the BB or RF subsystems. The overall system may be simplex, half-duplex or full-duplex, the link being duplex.

Figure 2:
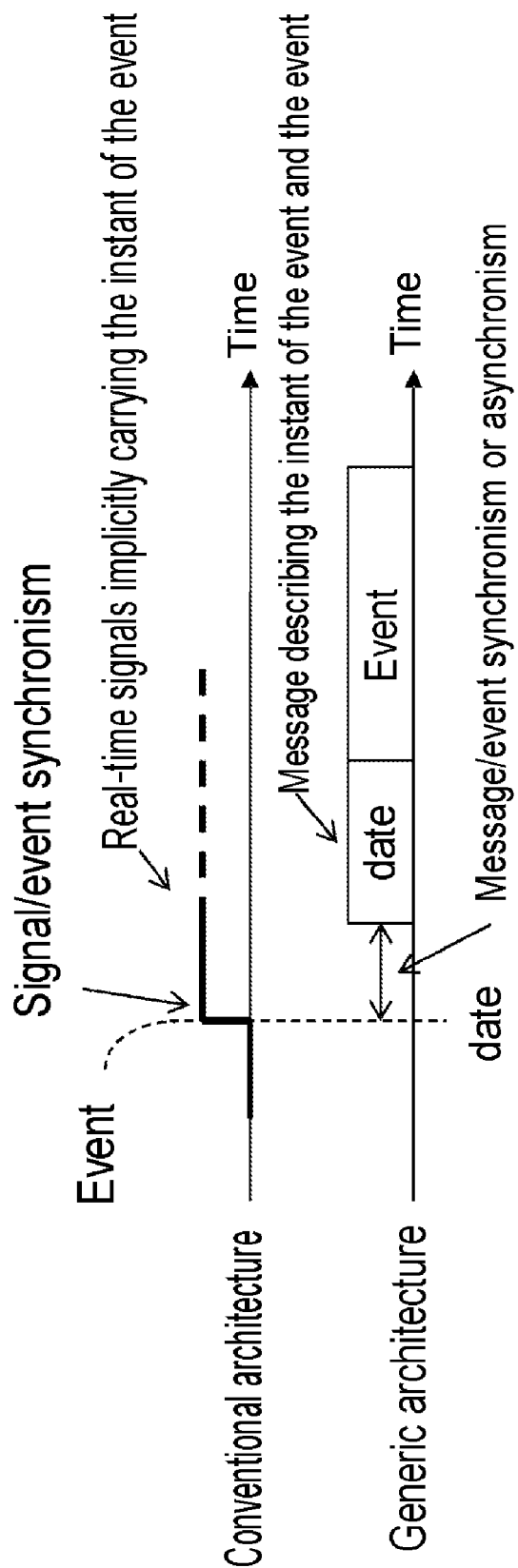

FIG. 2 uses a timing diagram to illustrate, in the upper part, the principle of event flow for an architecture according to the prior art. On a given date t, synchronism exists between a specific signal controlling the execution of an event and the real-time signals that implicitly carry the instant of the event.

The lower part of FIG. 2 illustrates, using a like timing representation, the principle of message exchange that is used within the context of the invention. It can be seen in the figure that there may in that case be either synchronism or asynchronism between the message and the event itself. For that purpose, the message notably has the date of the event and the description of the event itself as information.

Figure 3:
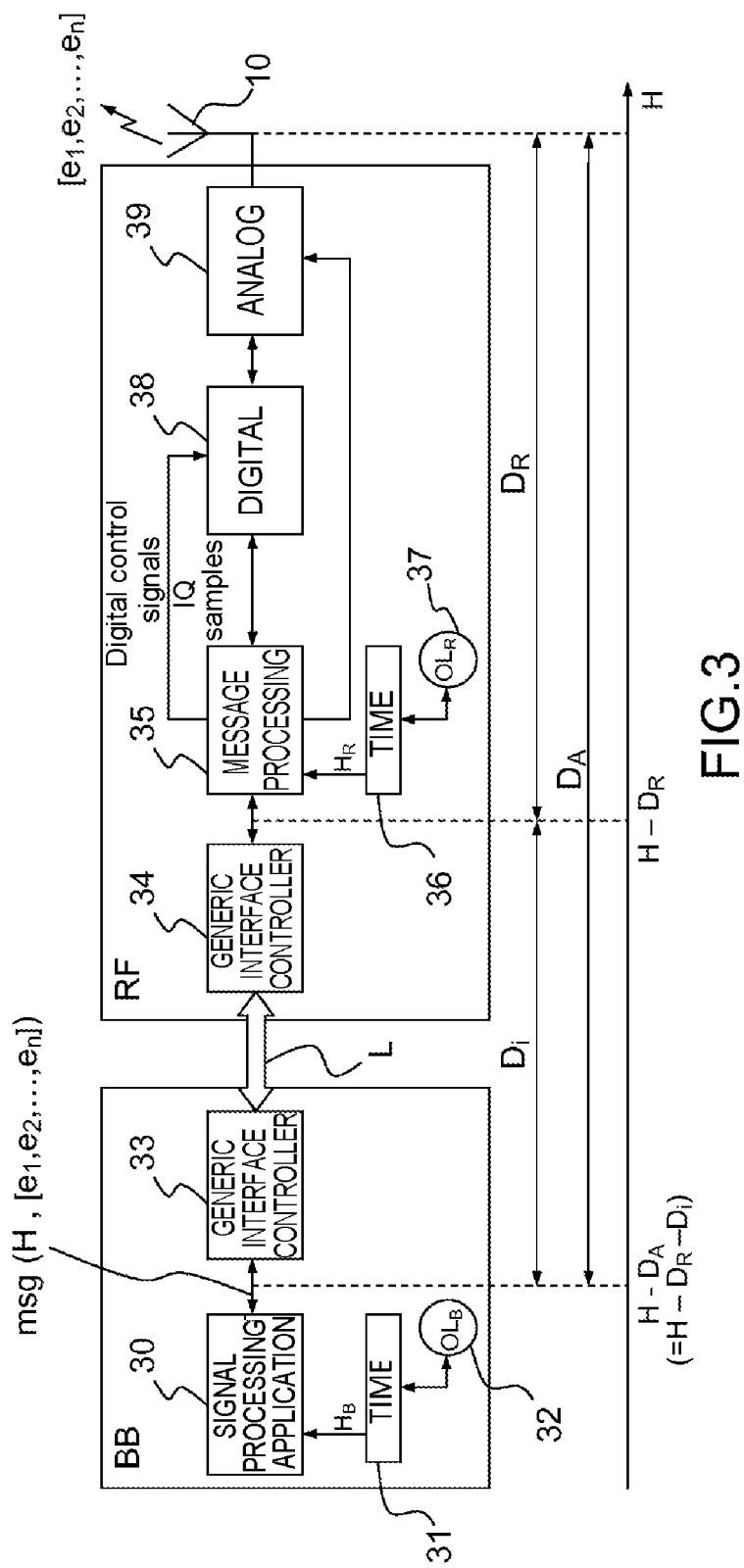
FIG. 3 shows a representation of the architecture according to the invention.

FIG. 3 shows an example of architecture according to the invention and reveals the characteristic delays to be taken into account.

The baseband part (BB) has, by way of example, a signal processing application module 30, or Application BB, which uses a local time or real-time time $H_B$, 31, to clock its operation. The local time is maintained by a local oscillator $OL_B$, 32. The application module TS implements all of the functional and specific processing operations on the physical layer of a radio system. The application module can generate the messages intended for the radio subsystem chronologically or otherwise. By way of example, the application corresponds to the application that can be deployed for the SCA or SDR, or to the loadable or reloadable application in conventional architectures. The application manipulates one or more signals at minimum sampling frequency in a complex baseband I/Q format. The signal carried may nevertheless also be real, however (non-centered spectrum on the zero frequency).

The application TS of the BB in normal operation does not need to know the exact delays of the RF, but only needs to know the minimum and single anticipation time for sending a command to the RF; it is the RF module itself that takes charge of executing at the correct moment the command(s) necessary for the action of the command to be able to be implemented at the right time on the antenna plane. The RF module therefore performs the adjustment that is necessary for the moment at which the command or the event are triggered, according to the type of the command or event and the physical implementation of the RF module.

At transmission, the signal and the commands from the signal processing application are transmitted to a generic interface controller 33, via an encapsulation in formatted messages. The signals are time stamped messages MSG(H, [ei]), where the "ei" correspond to the succession of samples to be transmitted. The commands are likewise time stamped messages. Examples will be given in the remainder of the description. The reverse is identical at reception.

The RF part comprises a generic interface controller 34 linked to a message processing module 35. The message processing module uses a local time or real-time time $H_R$, 36, that is fed with power by a local oscillator 37, $OL_R$. At transmission, the message processing module 35 transforms the messages into digital control signals for the digital part 38 of the RF part and analog control signals for the analog part 39 of the RF part, and extracts the IQ samples. A transmission antenna 10 transmits the signals associated with the radio application. The reverse is identical at reception.

The generic interface controller 33 of the BB part and the generic interface controller 34 of the RF part implement the exchange protocol and the support for control of the physical link. The function of the protocol is notably to control the routing times and the timing synchronization between the two clock domains BB and RF ($H_B$, $H_R$). According to the capabilities of the physical protocol used, the generic link is made up solely of data signals, for example, or it may be complemented by two specific discrete signals (not mandatory, depends on the design):

a signal for the timing synchronization $H_R/H_B$,
a signal for propagating and sharing the same local oscillator OL between BB and RF, this local oscillator signal can also be delivered directly to the BB and the RF if the architecture so requires.

To allow implementation of the architecture according to the invention, the signal processing application module must operate with anticipation in relation to the real-time time and must use a time stamped messaging system for exchanges with the radio RF.

In order to ensure the control of the times and to guarantee correct real-time operation, the two BB and RF subsystems forming the architecture according to the invention implement a time function. The two subsystems use the same format for the time. According to one mode of implementation, the baseband module will act as the time master for the radio module RF, which is a slave. Without departing from the scope of the invention, it is also possible to imagine an application in which the radio module is a time master and the application module is a slave.

The application TS operates with a minimal temporal anticipation value $D_A$ to be complied with in relation to the real-time clock $H_B$.

A part $D_R$ of the value $D_A$ is obtained from the RF itself, for example before the application is started up. This value $D_R$ is unique for each RF, or for each configuration that the RF is able to manage. A multiband radio (VHF/UHF), for example, can have different time constants in VHF or UHF configuration. $D_R$ corresponds to the maximum latency of the longest-lasting radio frequency RF capability to be executed.

The second part of the anticipation value $D_I$ is obtained either through design of the hardware interface between the BB and the RF (constant) or by explicit measurement of the transit time between the controller of the generic interface of the BB and the controller of the interface of the radio frequency module, which measurement is taken in the startup phase of the system. This transit time value $D_I$ is unique for a given physical interconnection pattern.

The values $D_R$, $D_A$, $D_I$ are deterministic values. The minimum anticipation duration $D_A$ with which the application will work is obtained from the sum of $D_I+D_R$. In order to avoid a significant increase in the radio frequency hardware resources RF, the application TS must likewise comply with a maximum anticipation duration $D_M$.

Figure 4:
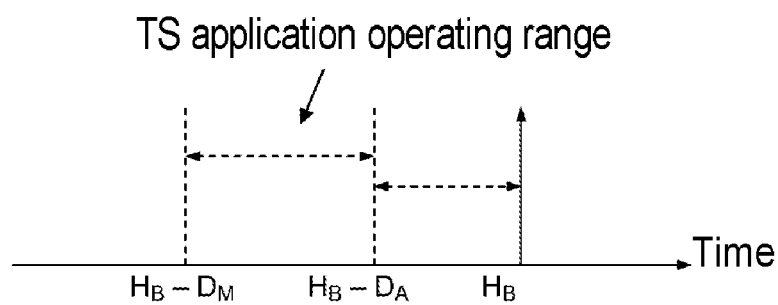
FIG. 4 shows a representation of the operating range of the application.

Under these conditions, the application TS can operate in an operating time window defined by $[D_A, D_M]$ in relation to the real-time clock $H_B$, allowing it to de-restrict its dependency on the RF, and to be able notably to operate with a temporal jitter. The range of application operation of TS is shown on a time axis in FIG. 4.

The BB and RF subsystems communicate by means of exchanges of time stamped messages bearing several types of information, for example:

commands for controlling the capabilities of the RF subsystem, for example, in order to synchronize the times $H_R$ and $H_B$, the transmission, the reception, the carrier frequency ($f_0$), the output power ($P_{TX}$), etc., I/Q samples: sampled baseband signal to be transmitted, or that are received, data: used for the purposes of configuring one or other of the subsystems, or for control or monitoring purposes (temperature, local time, locked OL, activities, etc.).

Sending of the time stamped messages by the application of the BB to the RF will comply with the minimum anticipation value $D_A$. The messages received by the BB from the RF arrive with a delay $D_A'$, the value of which corresponds to the implementation of the system. This delay value is of the same order of magnitude as the minimum value $D_A$, but it may be different because the processing operations on the data path may be different. For the sake of a balance between transmission and reception, it is possible to envisage making the values of $D_A$ and $D_A'$ correspond by design, for example, by making $D_A$ equal to Max($D_A$ and $D_A'$).

At transmission, a packet of samples needs to be sent before the current time (H-$D_A$) in a message for which the date of implementation is H, that is to say that the first sample of the packet must be present at the antenna output of the radio module RF exactly at the time H.

At reception, a packet of samples is received at least after the implementation time H, in a message for which the date of implementation is H, that is to say that the first sample of the packet has been acquired on the reception antenna of the radio module RF exactly at the time H. The expression "implementation time of a message" defines the date or time at which the RF module or subsystem will have had to perform an action described in the parameters of the message. The implementation time of a command on the antenna plane corresponds to the instant of presentation of the data on the antenna plane.

Figure 5:
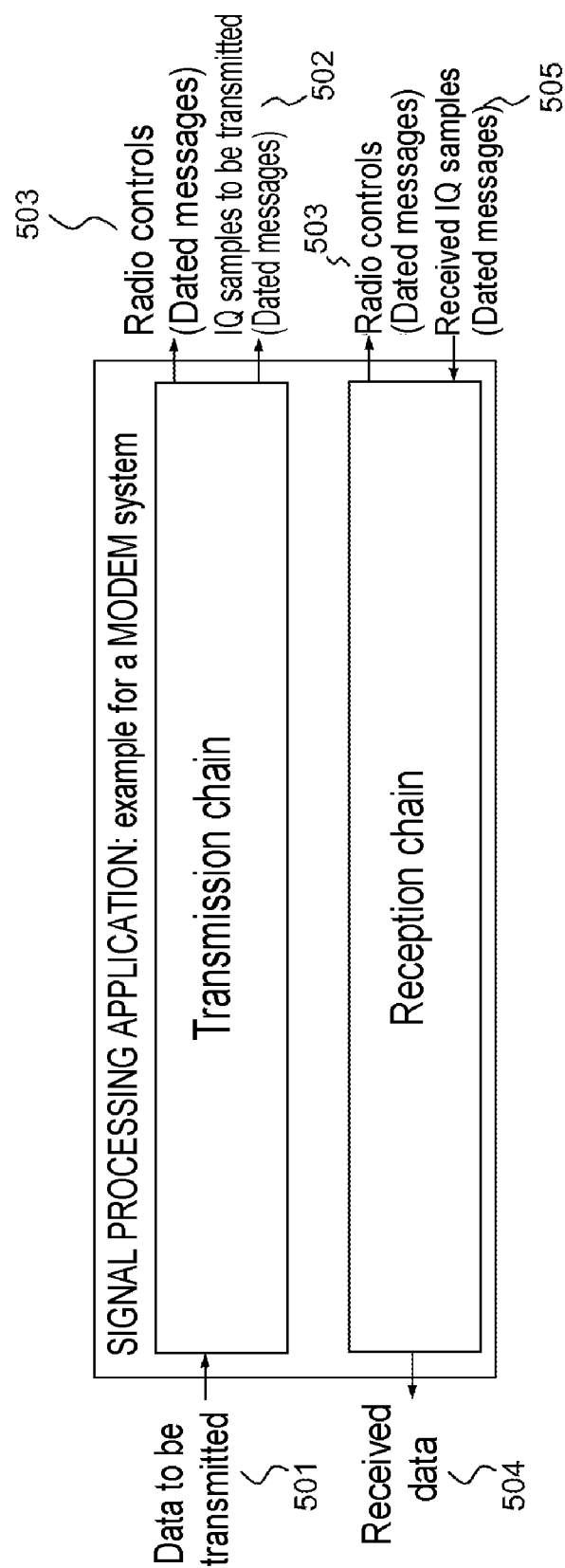
FIG. 5 shows a representation for a MODEM application.

In the case of a signal processing application of MODEM type, FIG. 5 illustrates the principle of operation of the application TS.

At transmission, the data to be transmitted 501 are transmitted to a processing chain comprising, by way of example, a channel coding module, followed by a modulation module, the coded and modulated signals are sent to a module that is adapted to insert reference sequences, and then the signals are transmitted to a spectral shaping module. The control for the elements of the radio that are associated with the signal is likewise generated, containing the sampling frequency, the transmission instant, the output power, the quantization of the samples, etc. The spectral shaping can be followed by an optional restitution chain. At the output of the transmission chain, there are only messages leaving for the RF. The radio control messages 502 from the transmission chain are time stamped and have the parameters that characterize the radio controls or the events. The I/Q samples, 503, to be transmitted are also in the form of time stamped messages.

At reception, the application TS generates messages for controlling radio signal acquisitions and obtaining IQ samples. These messages are of outgoing type only, 505. The signal I/Q samples are received by the application TS in time stamped messages of incoming type, 503. They are transmitted to a reception processing chain comprising, for example, an acquisition chain, and then an adapted filter, and to a synchronization module, and then to an equalizer, the samples are then demodulated and then decoded. One output of the reception processing chain comprises the received data 504. Another output corresponds to the radio controls 505 that are in the form of time stamped messages.

The signal processing application TS does not need to know the design elements of the RF module. The messages generated by the application in order to control the radio operation notably have the following parameters: the sampling frequency, the reception frequency, the reception instant, the gain, etc.

Figure 6:
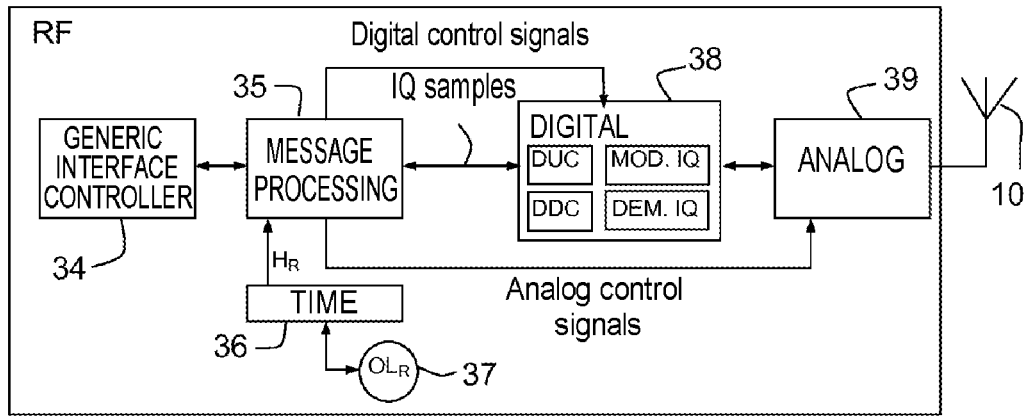
FIG. 6 shows an illustration of the processing operations of the RF part.

In the case outlined in FIG. 5, for example, the RF part comprises, as in FIG. 6, a generic interface controller 34, a message processing module 35 for the messages from the generic interface controller 34, which receives a time $H_R$ from a TIME module 36 linked to a local oscillator 37. The result of the messages processed at the output of the message processing module are control signals that have the aim of controlling the digital part 38 of the RF, control signals that will control the analog part 39 of the RF part and IQ samples. At transmission, the analog part receives the signals from the processing operations of the digital part and has the aim of implementing the functions allowing the signals to be transmitted to the transmission/reception antenna 10 (and vice-versa for reception).

In the case in FIG. 6, the digital part of the radio integrates capabilities for changing sampling frequency up or down in terms of frequency or DUO for digital up converter/DDC 50 for digital down converter, said capabilities being adapted for implementing the interface with the analog/digital or ADC converters and the digital/analog or DAC converters. It is not, within the context of the invention, recommended that this function be processed by the BB device. The principle is that the RF will adapt to its level in order to avoid the application being dependent on the design of the conversion chain that is in the RF and that is therefore specific thereto.

The structure of the messages is important for unambiguously identifying the nature of the information contained in the messages. The architecture will therefore use a typing system for the messages that is preferably systematic, unique and implemented on a message-by-message basis. Each message will bear a value of unique type. Without departing from the scope of the invention, it will also be possible to create messages bearing a plurality of types, with, consequently, an extension of the duration of the messages and an extension of the latency of the exchanges.

Figure 7:
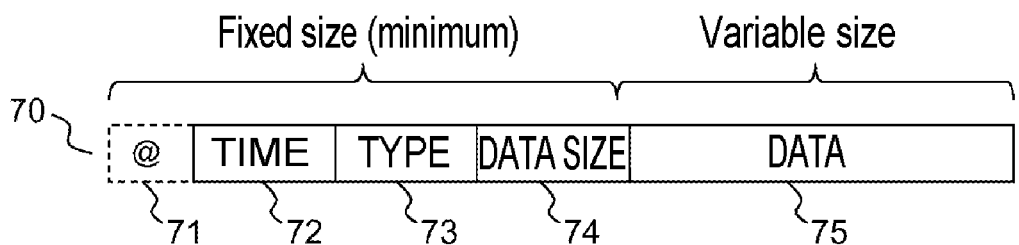
FIG. 7 shows an example of message structure corresponding to the principle of the invention.

FIG. 7 shows an example of structure that is used for the messages 70. By way of example, the message is made up of a first fixed part and of a second part of variable size.

The first part comprises an address, 71, followed by the implementation time 72 of a message, the type 73 of a message and the size of the data 74. The second part of variable size comprises a field 75 of variable size for the data. The chronological generation of the time stamped commands 502, 503 by the application 30 is not necessary in order to guarantee that said commands are implemented on the date required or the implementation time 72 on the antenna plane 10.

The implementation time can be deduced from the value $H_B$ if the message is sent from the BB, or from the value $H_R$ if the message is sent from the RF structure.

The message type may be: a single packet of I/Q samples, multiple packets of IQ samples (indication: startup, in progress, stop), an RF configuration (time synchro/maintenance, RF capabilities, etc.).

The size of the data corresponds to the number of data that the second data part contains.

Within the context of a "long" transmission or reception of I/Q samples (continuous transmission/reception of infinite or unknown duration, or of very significantly great duration in relation to the duration of the samples), the packet of samples exchanged between the BB part and the radio part will be segmented into a plurality (n) of messages $m_i$, in order to optimize the required speed, only the first message $m_1$ contains a date or time that will be used by the RF. The other messages $m_2, \ldots m_n$ contain a piece of continuity or end-of-sequence information. The type of the message allows segmentation to be performed, for example. The messages allow a plurality of quantization values to be carried for the IQ samples. By way of example, it is recommended that the following quantizations be retained: $Q=1, 8, 12, 16$ and $24$. The variable quantization of the IQ samples notably allows the speed on the generic link transmitting the messages to be limited. This allows a wider frequency band to be processed when a great dynamic range is not required, which is the case when the automatic gain control AGC is performed by the RF.

The dates contained in the messages correspond to the instants at which the content of the associated message is implemented:

at transmission, in an IQ sample message created by the BB, the date indicates the instant of output of the first sample on the antenna plane, said date is deduced from the time $H_B$, at reception, in an IQ sample message created by the RF, the date indicates the instant at which the first sample is taken into account on the antenna plane, said date is deduced from the time $H_R$, in an RF configuration message created by the BB, the date indicates the instant at which the RF needs to be configured for the incoming/outgoing samples, said date is deduced from $H_B$, in a control or monitoring message created by the RF, the date indicates the instant at which the measurements are taken, said date is deduced from $H_R$.

When a plurality of RF subsystems need to be addressed with one and the same BB, or a plurality of BB for one or more RF, it is possible to use the idea of header address.

When an RF natively integrates a plurality of transmission and reception channels, an idea of channel coupled to the type of messages will be used.

The addressing and channel system allows all the necessary flexibility to be able to process SIMO/MIMO systems implemented using a single or multiple RF module.

Figure 8:
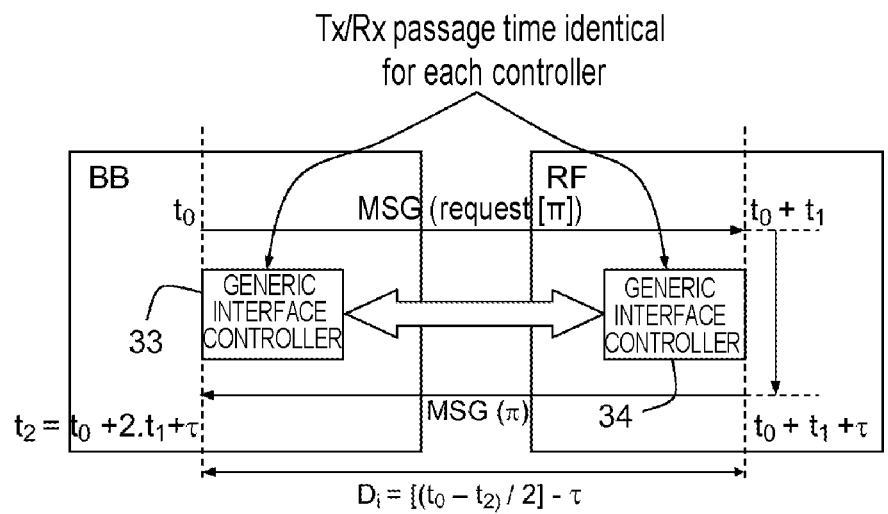
FIG. 8 shows the computation of the delay time for a message.
Figure 9:
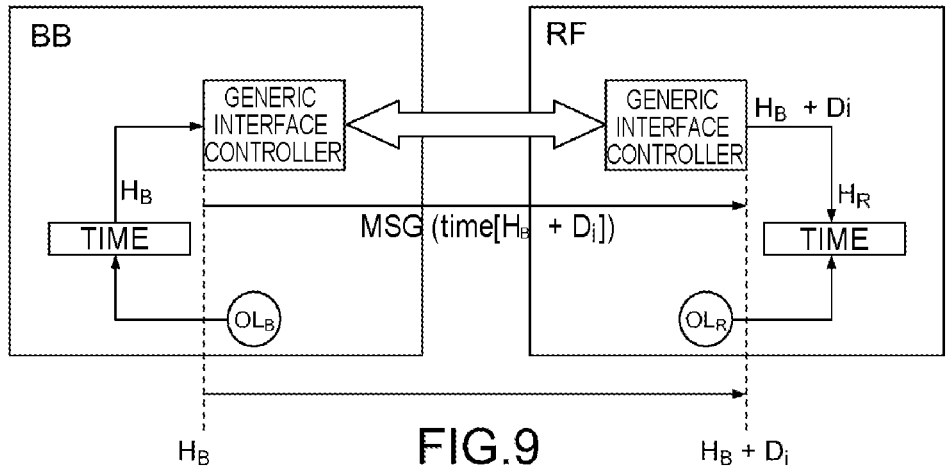
FIG. 9 shows the synchronization of the times.

FIG. 8 schematically shows the loop implemented from the BB allowing computation of the transit time between the two generic interface controllers. To guarantee overall real-time operation, this time needs to be taken into account. The transit time $D_I$ must be deterministic and reproducible. By way of example, the value of this time can be measured on startup of the system by implementing a transmission/reception loop from the BB module. The loop is implemented from the BB and consists in sending a request message for loop response generation time τ to the RF. This time τ corresponds to the time that is necessary for the RF to send back its response to the BB.

$t_0$ corresponds to the instant of transmission of a message from the BB to the RF, $(t_0+t_1)$ to the instant of reception of this message MSG by the RF, $(t_0+t_1+\tau)$ to the instant at which the RF generates the response message, τ: the time for generating a message and $t_2=t_0+2 \cdot t_1+\tau$ to the instant at which the BB receives the message from the RF. The transit time $D_I$ is equal to $[(t_0-t_2)/2]-\tau$.

The generic interface controller 33 (BB) or 34 (RF) must allow synchronization of the times $H_B$ and $H_R$. For that purpose, it uses a specific message MSG(time[$H_B-D_I$]) sent from the BB, the time master for the system, to the RF, which plays a slave role. This message is sent by the BB at a precise instant so that this message arrives exactly at the instant of time set corresponding to the time message that it carries. The time $H_R$ of the RF is kept identical to $H_B$, by virtue of the periodic maintenance performed by the interface controller 34. The maintenance procedure is, by way of example, carried out by exchanging dedicated periodic messages between the BB and the RF. The BB and RF resynchronization frequency is dependent on the precision difference of the local oscillators OL, if they are different. BB and RF share one and the same time value ($H_B=H_R$).

The generic link L corresponds to the physical (hardware) interface between the subsystems BB and RF. The generic link verifies the following features:

the absence of physical signals having a direct link to knowledge of the hardware design of one or other of the BB or RF subsystems, the link does not integrate discrete signals for commands corresponding to the control of a specific element that is present on the RF, the signals do not comply with a frequency, a specific voltage that would be induced by the design of the RF subsystem, the propagation of the messages is deterministic so as to ensure, notably, the synchronization between the two time domains BB and RF, the speed that it supports meets the needs of the applications of the system.

The physical generic link is adapted for conveying the time stamped messages. The link is chosen according to, notably, consumption constraints, the distance separating the BB and the RF and the speeds necessary for the application TS. By way of example, in order to cover a complex sampling frequency range up to 20 MHz, with 16-bit quantization, according to the speed surplus required by the message headers, a speed of 640 Mbps is required. However, a large number of applications do not require more than 8 quantization bits, especially when the digital part of the RF takes care of the DUC/DDC function and the automatic gain control or AGC. By way of example, it is possible to use Gigabit Ethernet technology for the physical part of the generic link.

Figure 10:
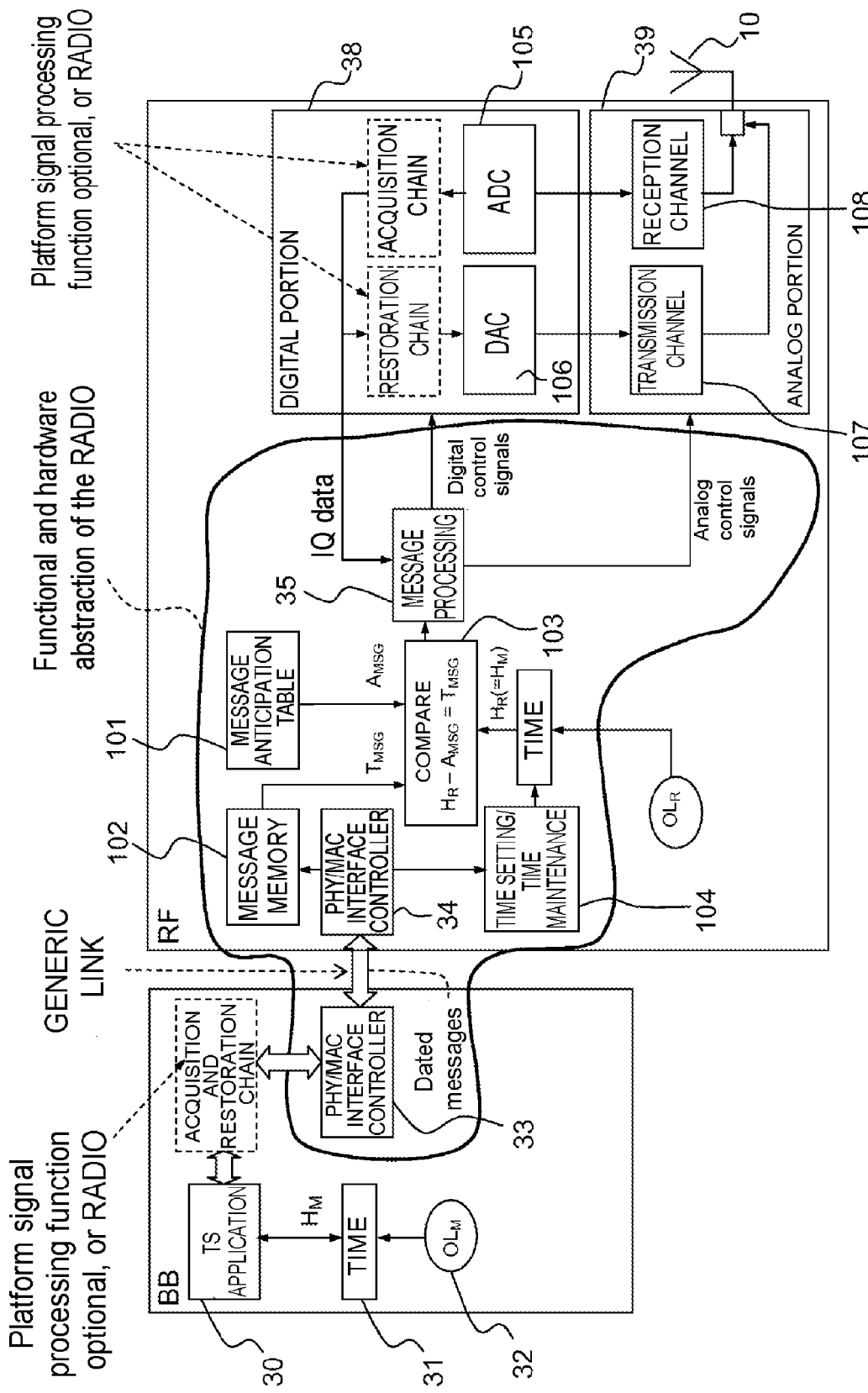
FIG. 10 shows a functional representation of the processing operations of the interface according to the invention.

FIG. 10 is a functional overview of the elements implemented by the interface according to the invention. As in FIG. 2, the BB part has a local oscillator, a clock, an application TS and an interface controller. According to one implementation variant, it is possible to add an acquisition and restitution chain (DUC/DDC), which are known to a person skilled in the art.

By way of example, the RF part has a generic interface controller 34, a message processing module, 35, a message anticipation table 101, a memory 102 for the messages, a comparator module 103 that receives the various times, an implementation module 104, a clock, a local oscillator, a digital part comprising an analog/digital converter 105, a digital/analog converter 106, an analog part comprising a transmission channel 107 and a reception channel 108 linked to the antenna 10. There are no technological constraints to be observed for the type of memory to be used. The method does not require the RF subsystem to sort the content of the memory 102 containing the messages.

The message processing module is adapted to execute the messages received from the BB and for generating messages to be constructed and to be sent to the BB. This module notably has the function of controlling the entire RF part and is a guarantor of real-time compliance. This module interprets the messages received from the BB, notably the times of application of the messages. It uses the local time $H_R$ in order to anticipate the execution of the message. It generates all of the command signals that are internal to the RF module aiming to parameterize the digital and analog processing operations. This module loads all of the real-time sequencing functions. It generates all of the discrete signals used for parameterization operations and the necessary controls.

Figure 11:
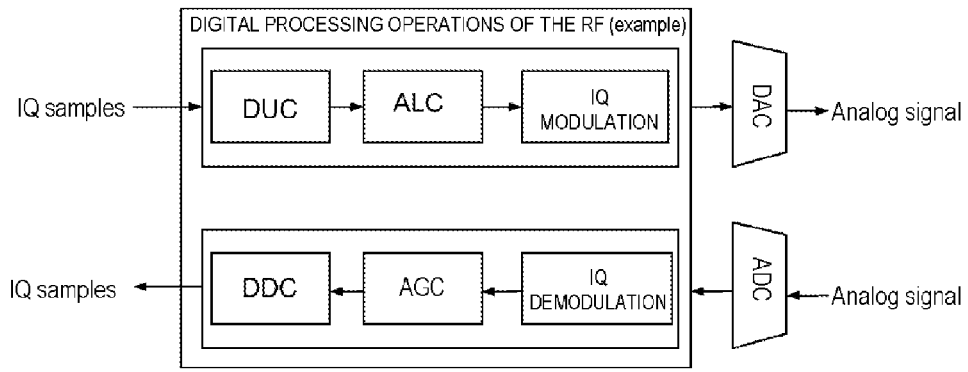
FIG. 11 shows an example of the digital processing operations of the RF part.

The digital part of the RF notably comprises a set of modules that are adapted to the digital processing operations of the RF that are shown in detail in FIG. 11. These modules notably have the function of supporting specific processing operations from the design of the radio and of allowing correct execution of the messages. The processing operations executed on the digital part of the RF are controlled by the sequencer module for processing of the messages.

The I/Q samples of the message at the output of the message processing sequencer are transmitted to a DUO module, for example, in order to manage the rise to the sampling frequency of the DAC, and then the samples pass through a module for managing the transmission power (automatic level control or ALC), before being modulated and converted within the DAC.

The analog signal received on the reception antenna is converted into digital samples that are demodulated in order to obtain the I/Q samples. The I/Q samples are then transmitted to a module for managing the transmission power ACG, the next step consisting in controlling the fall to the sampling frequency in the DDC module.

The RF part comprises all of the analog processing operations known to a person skilled in the art between the input/output of the ADC/DAC and the transmission/reception antenna. These processing operations are controlled by the message processing sequencer module that transmits analog control signals to the analog part of the RF. As analog processing operations that will not be set out in detail in the description, it is possible to cite the filtering, the power amplifier or PA, the switches, the transposition, the low noise amplifier or LNA, etc.

The steps of processing of the messages from the BB part that are processed in the RF part are as follows, for example:

a message MSG sent from the BB to the RF is routed with a known latency Di to the RF interface controller 34, this message is stored in the message memory 102 and put on hold for processing. The size of the message memory corresponds to the number of messages that one wishes to be able to send in advance from BB. By way of example, it is possible to dimension the message memory so that it contains 4 or 5 messages for a half-duplex transmission system and twice as many for a full-duplex system, the message anticipation table 101 contains the temporal anticipation values corresponding to each type of message (for example configuration message, I/Q sample message, etc.) that are used by the message processing module in order to implement the message, that is to say to execute it;

the comparator 103 verifies the desired implementation time for each message stored in memory $H_{MSG}(1 \ldots N)$ using the time $A_{MSG}$ that is necessary for it/them to be processed according to the current time $H_R$, so as to trigger the processing of the message at the moment that guarantees the implementation time. When the condition $H_R-A_{MSG}=H_{MSG}$ is fulfilled, the processing module will start execution of the message. The execution of the message consists notably in implementing all of the control and configuration sequencing, and data paths allowing the message to be implemented. These processing operations are intended to control both the digital part and the analog part of the RF subsystem.

Figure 12:
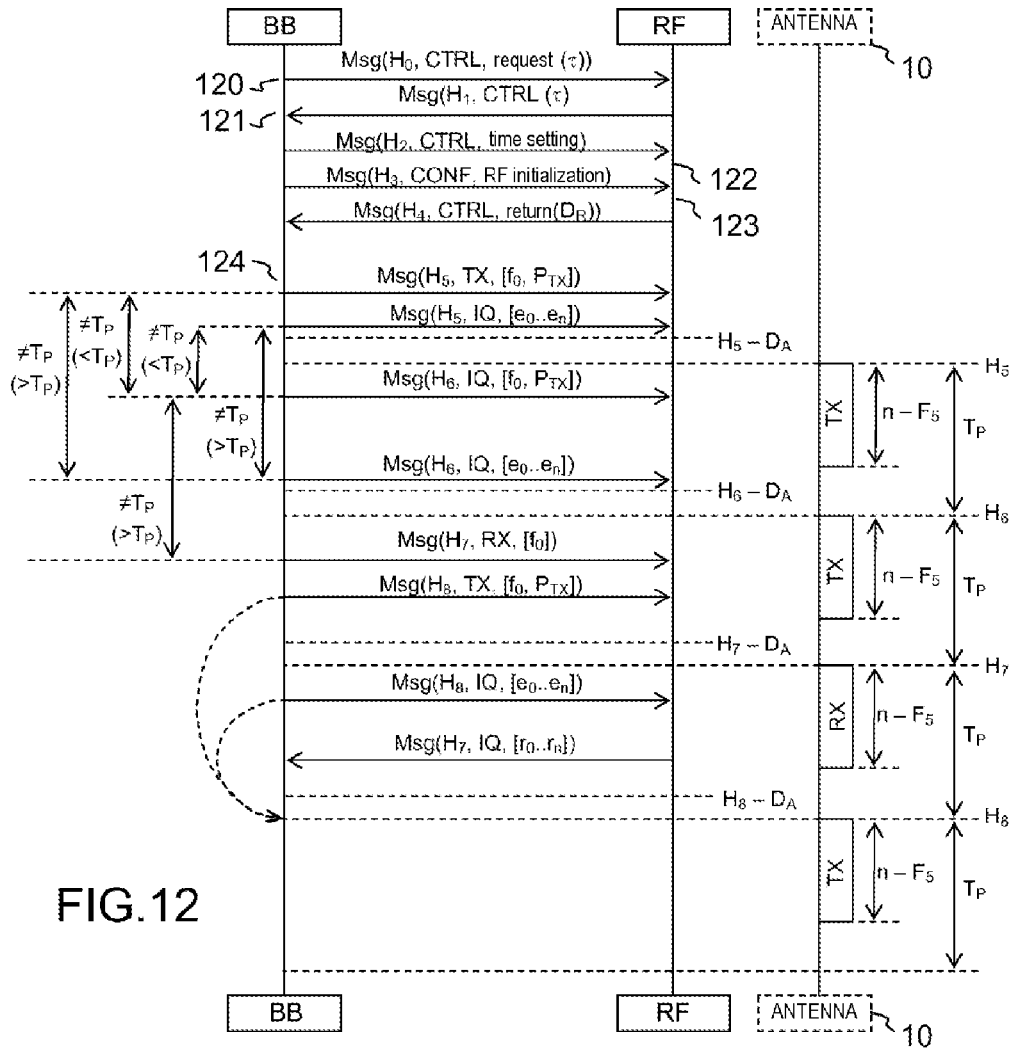
FIG. 12 shows an example of a sequence diagram between BB and RF corresponding to the method.

FIG. 12 shows a flow example for the steps executed by the method according to the invention.

At startup, the BB, which in this example is the master of the system, executes the initialization operations that are necessary for controlling the time on the RF. During this first initialization phase, the BB asks, 120, the RF of the value of the time τ that is necessary for the BB to compute the delay $D_I$ on the interface between the BB and RF. The RF provides it, 121, with this value.

The BB then configures the RF, 122, according to the desired mode of operation and, in return, 123, obtains the value $D_R$ allowing the BB to compute the anticipation time $D_A$ with which the application TS needs to operate.

When the RF is configured and the BB has the anticipation time $D_A$, the application TS starts its activity. This activity consists in exchanging time stamped messages $MSG(H_I)$ indicating to the RF the processing operations to be performed.

In the example of FIG. 12, a waveform having $N_S$ hops per second is considered, corresponding to the period $T_P$ between each transmission start.

The first message transmitted, by the message carrying the time $H_5$, indicates the frequency $f_0$ and the transmission power $P_{TX}$ to be used at the time $H_5$. This message allows control of the configuration operations of the RF for the time $H_5$.

The second message carrying the time $H_5$ contains the IQ samples to be transmitted at the time $H_5$. These samples are consistent with the configuration sent during the previous message for the time $H_5$. The order and sequencing of these messages has no importance other than the anticipation constraint described below.

The messages sent by the BB to the RF part are all transmitted with an anticipation of value $D_A$, and are not necessarily in sync with the stage instants of the antenna. The messages are not strictly spaced by $T_P$, and they can be sent either during the previous stage or even two stages beforehand, for example, the command of the stage Tx on $H_8$ is sent two stagesbeforehand. At transmission, the messages are asynchronous with the operation of the RF.

The RF controls real time. On the antenna plane, each stage is duly transmitted at the desired instants ($H_5$, $H_6$, $H_7$, $H_8$) and the signals transmitted or received have a duration of $n \cdot F_S$, where n is the number of samples and $F_S$ is the sampling frequency, a period that corresponds to the real period of the samples.

Figure 13:
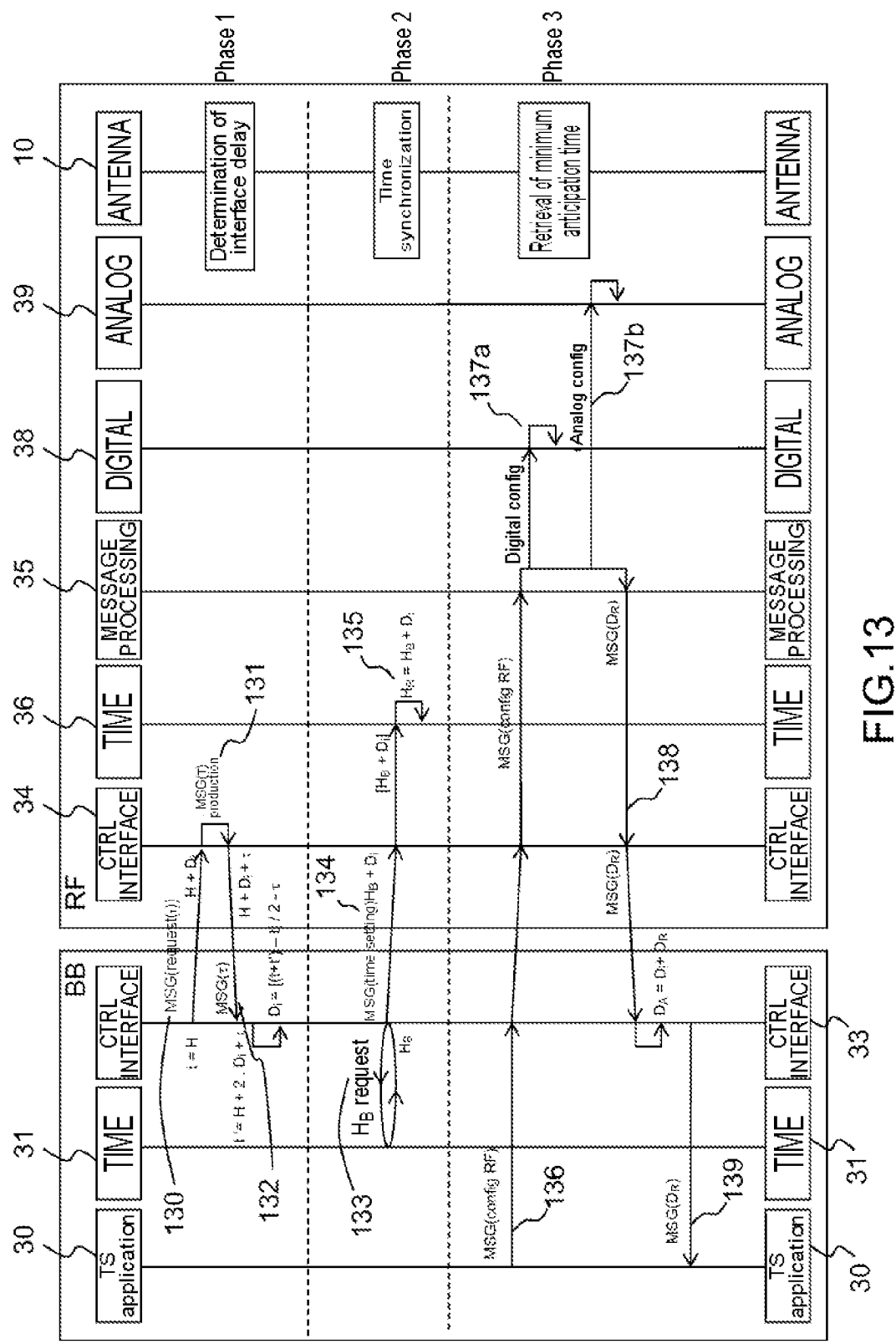
FIG. 13 shows an example of a sequence diagram between modules corresponding to the startup of the system according to the method.

FIG. 13 schematically shows a flow example for the steps involved at startup of the system. By way of example, startup of the system has three phases.

In the first phase, the delay of the interface between the BB and RF is determined, then, in the second phase, the times of the BB and the RF are synchronized, and then, in the third phase, the BB configures the RF and retrieves the minimum RF anticipation time.

For that purpose, in the first phase, the method will implement a transmission/reception loop between the BB interface controller and the RF interface controller. At the instant t=H, 130, the BB interface controller sends a message MSG(request (τ)) to the RF interface controller in order to retrieve the time necessary at the RF for producing, 131, the return message MSG(τ) that contains the time τ. The instants of departure t=H and arrival t'=H+2$D_I$–τ for the loop are measured by the BB, these values associated with the information for the RF response processing period allow computation of the delay for the interface $D_I$. The periods for production and reception of the message by the BB are not necessarily indispensible because, if they are equal, their contributions cancel one another out. If they are different, their individual contributions are known and they can be taken into account.

In phase 2, the BB transmits, at the instant $H_B$, 133, a message MSG(time set [$H_B$+$D_I$]) to the RF containing the time $H_B$ increased by the interface delay $D_I$, the period necessary for routing the message to the time module of the RF. On reception of the message by the RF, it is sufficient to reset the time counter to the received value.

In phase 3, the application TS sends, 136, by means of a message MSG(Config RF), all of the configurations and/or configuration information necessary for it to operate, broken down by the RF into digital configuration 137a and analog configuration 137b. In return, the RF returns 138 a message MSG($D_R$) containing the anticipation duration $D_R$ that is necessary for processing the messages addressed to it. The interface controller of the BB then accumulates the anticipations $D_A=D_I+D_R$ and provides, 139, this value for the application TS. This minimum anticipation $D_A$ is observed by the application TS for conversing with the RF.

Figure 14:
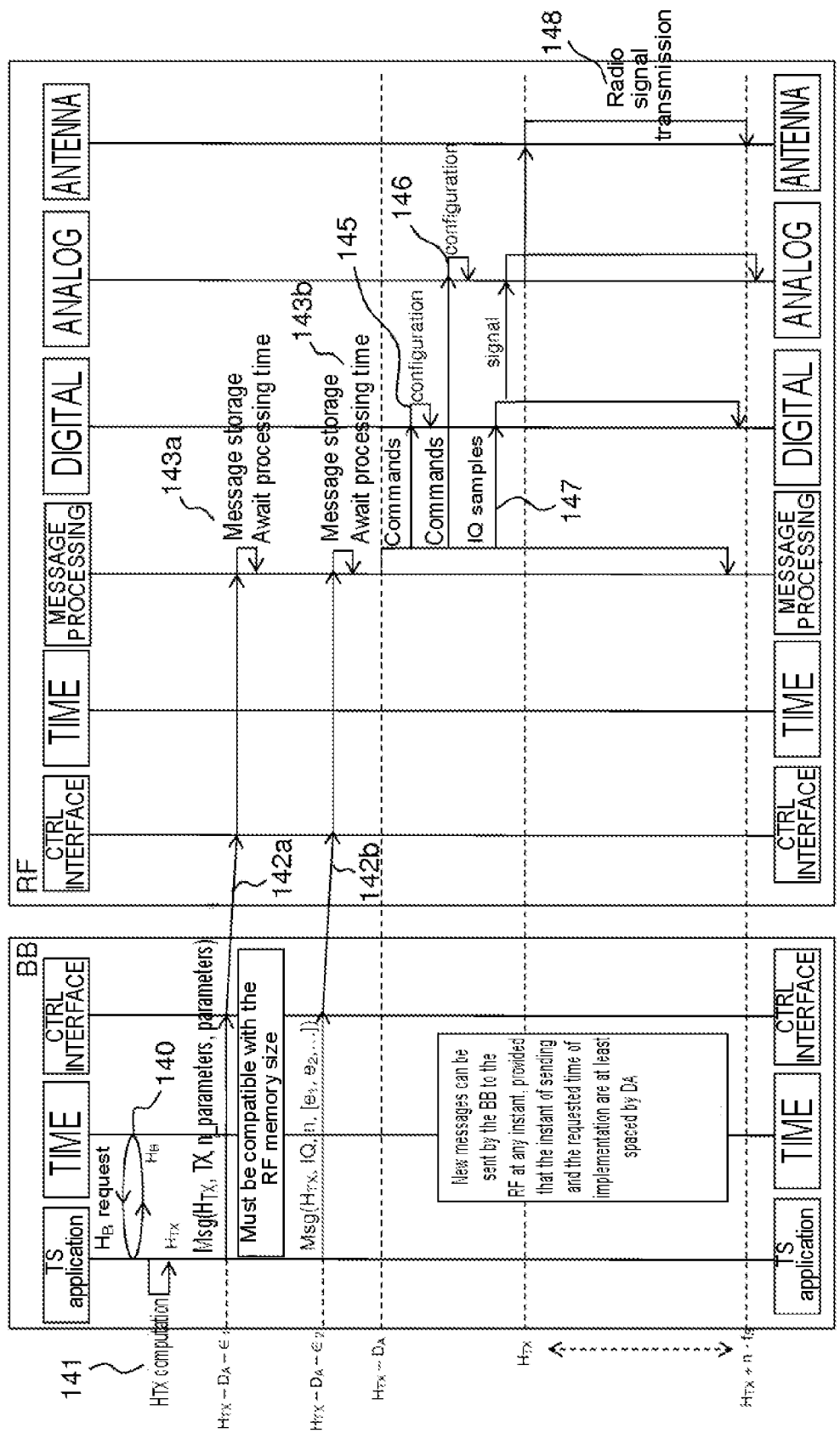
FIG. 14 shows a sequence diagram corresponding to the transmission of a packet of samples with the associated RF configuration.

The system having been configured, the BB will request transmission of IQ sample packets, FIG. 14. The application TS acquires the current time from the time module. It then determines, 141, according to its own needs, the time $H_{TX}$ at which it chooses to see a signal leave the foot of the antenna, corresponding to the first sample of the packet that it has generated or that it will generate.

Knowing the minimum anticipation time $D_A$ necessary for processing the message, the application TS sends two messages 142a, 142b to the RF before the date or instant $H_{TX}$–$D_A$. The times $\epsilon_1$ and $\epsilon_2$ on the diagram represent the temporal anticipation before $H_{TX}$–$D_A$ that the application TS takes in order to generate the messages 142a and 142b. The first message corresponds to the order to change to transmission from the instant $H_{TX}$, with the desired configuration of the RF (for example the transmission power, the carrier frequency, etc.), the second message corresponds to the IQ samples that are associated with this configuration.

The messages are routed, by the interface controllers of the BB, to the RF and are immediately stored, 143a, 143b, in the memory of the RF. The message processing module 35 likewise immediately determines the temporary storage times for each of the two messages before starting execution of said messages. The storage times may be different depending on the TYPE of the messages.

When the temporary storage times have passed, the message processing module executes the messages: it implements the digital 145 and analog 146 configurations of the RF, then activates, 147, the stream of the IQ sample data that are then routed 148 to the antenna foot in absolute compliance with real time.

Figure 15:
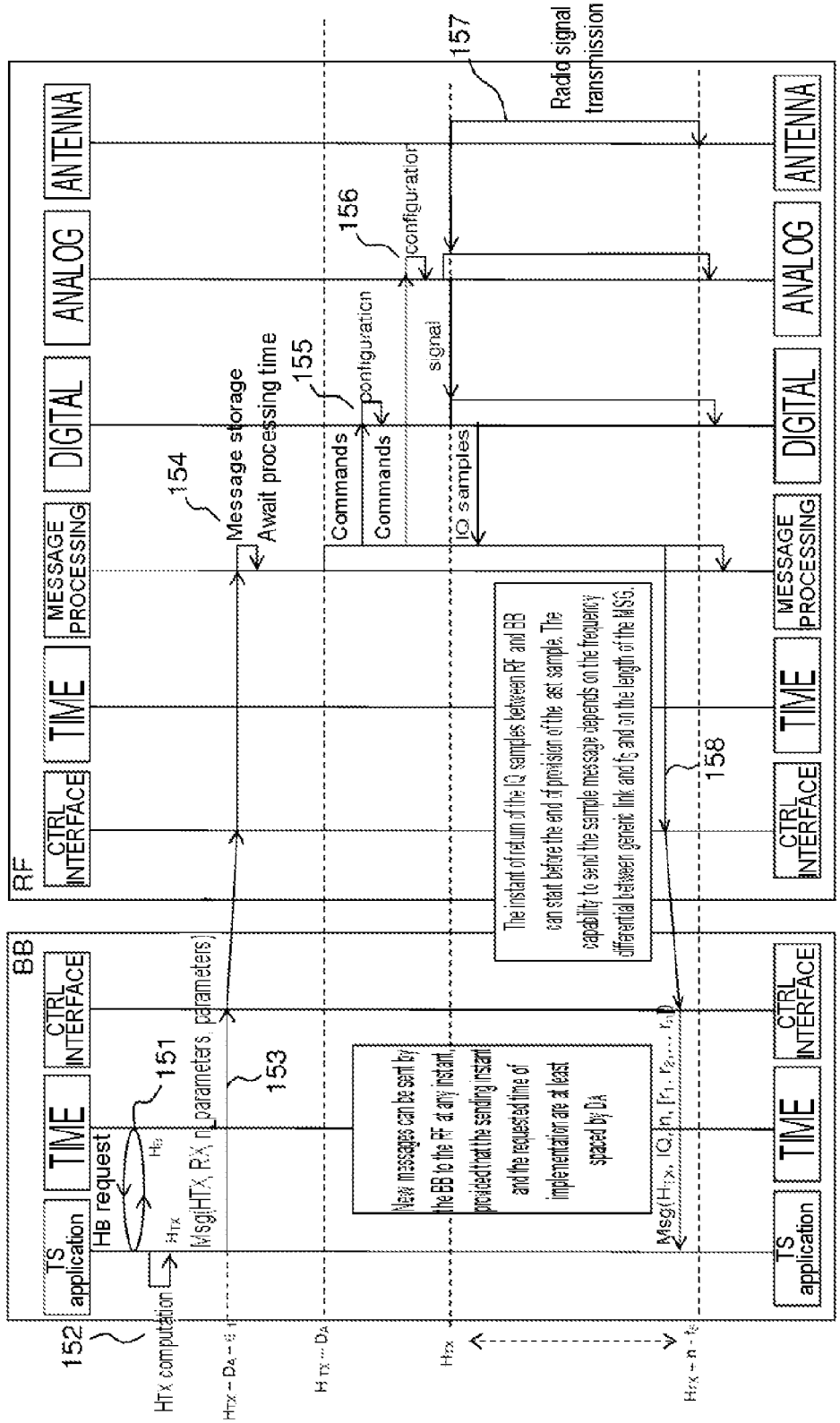
FIG. 15 shows a sequence diagram corresponding to the reception of a packet of samples with the associated RF configuration.

FIG. 15 illustrates the steps implemented for reception of a packet of IQ samples with an associated RF configuration.

In a manner that is symmetrical with the previous case, the reception of a packet of IQ samples is requested by the BB. The application TS acquires, 151, the current time from the TIME module. It then determines, according to its own needs, the time $H_{RX}$, 152, at which it wishes to acquire the signal from the antenna foot that will correspond to the first sample of the packet that it will receive.

Given knowledge of the anticipation time $D_A$ that is necessary for processing the messages, it needs to send, 153, a message MSG($H_{RX}$, RX, parameters) to the RF before the date $H_{RX}-D_A$. This message corresponds to the order to take account of the first sample Rx from the instant $H_{RX}$, with the desired configuration of the RF (gain, carrier frequency, etc).

The message is routed by the interface controllers of the BB to the RF and is immediately stored, 154, in the memory of the RF. The message processing module immediately determines the temporary storage time for this message before starting execution thereof.

When the temporary storage time has ended, the message processing module executes the messages: it implements the digital 155 and analog 156 configurations of the RF, then activates 157 the data path from the antenna foot to the output of the digital unit that provides the IQ sample data in absolute compliance with real time.

A message MSG($H_{RX}$, IQ, n, [$r_1, \ldots r_n$]) is then generated, 158, in the RF, containing exactly the instant $H_{RX}$, corresponding to the first sample of the packet, on the associated IQ samples. This message is then routed to the BB by the interface controller of the RF and the interface controller of the BB.

Figure 16:
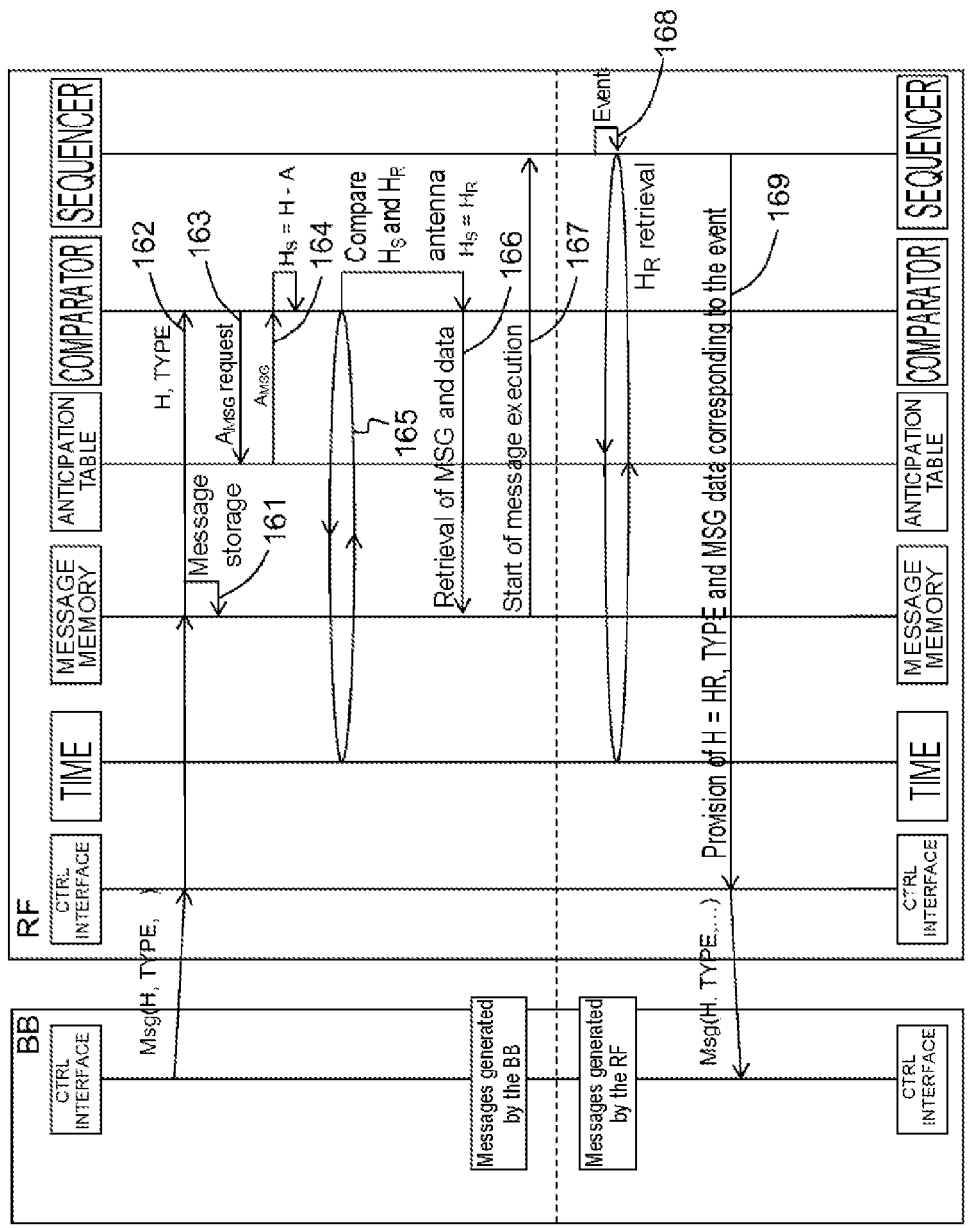
FIG. 16 shows a sequence diagram corresponding to the processing of the messages.

FIG. 16 illustrates the operation of the message processing.

The timing diagram in FIG. 16 details the internal sequencing operations of the "message processing" module of the three previous diagrams (FIGS. 13, 14 and 15). Two cases need to be considered: the messages generated by the BB and the messages generated by the RF.

When a message MSG(H, TYPE) is sent from the BB to the RF, this message arrives at the RF via the interface controller 34. The latter immediately sends 161 all of the data of the message (time, data, type, etc) to the memory for storing the messages, and exclusively, 162, the time H and the TYPE of message to the COMPARATOR.

The comparator consults, 163, (request $A_{MSG}$) the anticipation table that contains the processing times necessary for the RF and corresponding to each type of message. It then computes, 164, the instant of implementation $H_S$, corresponding to the instant of triggering of the (sequencer) processing module that will execute the message. The comparator then compares, 165, the date of implementation $H_S$ with the current time $H_R$, and, when equality occurs, the data corresponding to the message from the memory are retrieved 166 and execution of the message starts 167.

The transmission of a message from the RF to the BB is determined by the appearance of an event, 168. In the exemplary case of repatriation of IQ samples to the BB, the event corresponds to the instant of acquisition at the antenna foot, corresponding to the first IQ sample. At this precise instant, the message processing module or sequencer acquires the current time from the TIME module.

The sequencer constructs the message by placing the time of the event, the type of message and the IQ samples, which it sends, 169, opportunistically as quickly as possible to the BB. Depending on the relative speeds of the generic link, of the sampling frequency and of the size of the packets, it can be envisaged that the instant at which the message is sent occurs before the end of reception of the last sample of the packet.

Advantages

The use of a nonspecific generic physical interface allows abstraction of the specifics of hardware design on either side of the interface between baseband (BB) and radio frequency (RF). The baseband and radio frequency subsystems communicate by means of time stamped message exchanges that allow them to assess one another in logical fashion. The dates indicating the instants of implementation of the events (configuration, transmission or reception), the subsystems BB and RF can operate asynchronously, which allows real-time constraints to be decorrelated. Moreover, the exchange of messages allows precise knowledge of the capabilities supported by radio frequency and the associated performance levels to be dispensed with.

Consequently, the software implemented in the baseband part is independent of the radio frequency part. The subsystems defined in this manner can be reused directly with other modules of different design but complying with the same architecture framework.

Advantageously, the method does not express any constraint about the type (technology/architecture) of the memory 102 that needs to be used. It does not require the application TS 30 to chronically generate the messages intended for the RF, nor does it require the RF to sort the content of the memory 102 containing the messages.

The invention claimed is:

1. An interface architecture between a first digital baseband subsystem (BB) and at least one second radio frequency subsystem (RF) that is connected by means of a link L, which interface architecture comprising at least the following elements:
   at the digital baseband subsystem,
      a signal processing application module operating based on a time $H_B$, said signal processing application module is configured to generate and/or receive messages MSG(H, data) comprising a time H and data parameters including data associated with in-phase/quadrature (IQ) samples, said messages MSG (H, data) are associated with an operation of the at least one second radio frequency subsystem, and the signal processing application module works with a generic interface controller, the digital baseband subsystem has a functional and temporal view of the radio frequency subsystem:
      the radio frequency subsystem is seen from the first baseband subsystem and a baseband signal processing application as having a latency corresponding to a delay and processing time from the baseband signal processing application to a single antenna plane independent of a command sent to or received from the radio frequency subsystem,
   at the radio frequency subsystem comprising a digital part and an analog part,
      an interface controller linked to a module for processing the messages MSG(H, data), said module for processing the messages MSG(H, data) is configured to operate based on a time $H_R$, for transmitting control signals to the digital part and the analog part of the radio frequency subsystem, and for transmitting and/or receiving messages to/from the digital baseband subsystem, the module for processing the messages MSG(H, data) controlling all of the radio frequency subsystem, a memory for storing the messages MSG(H, data) awaiting processing, a message anticipation table containing temporal acquisition values corresponding to each type of message, said temporal acquisition values being used by the module for processing messages to implement the message, a module configured to compare an implementation time of a message with a time that is necessary for an execution of the message and to provide a signal for triggering the processing of the message for the module for processing the messages for generating control/command signals to said digital portion and said analog part portions, and a time-setting module, said interface controller configured to synchronize the time $H_B$ of the digital baseband subsystem and the time $H_R$ of the radio frequency subsystem such that $H_R=H_B$, said link L is adapted for driving the time stamped messages between the radio frequency subsystem and the digital baseband subsystem.

2. The interface architecture as claimed in claim 1, comprising a restitution chain and an acquisition chain at the digital baseband subsystem or at the analog part of the RF subsystem.

3. The interface architecture as claimed in claim 1, wherein the interface controller of the digital baseband subsystem is configured to generate messages having the following format: a field address, followed by an execution time of a message, the type of the message, a size of data of the message and a field for the data.

4. The interface architecture as claimed in claim 1:
wherein said interface architecture is on a system embedding the digital baseband subsystem and the radio frequency subsystem within a same housing, and/or
on a system in which the digital baseband subsystem and the radio frequency subsystem are accommodated in two housings that are physically separate and remote.

5. The interface architecture as claimed in claim 1, wherein the interface architecture is on systems configured for the following applications: radar system, tactical system including a portable radio and/or a vehicle radio, an aeronautical and a naval transmission system, a satellite communication (SATCOM) system, a goniometry system, a sensor/reflector system, a jamming system, an infrastructure transmission system, an instrumentation equipment, test bench, a navigation system, and/or spectrum monitoring system.

6. A method for guaranteeing an independence of a baseband application (BB) in relation to a radio frequency module RF, implemented in the interface architecture as claimed in claim 1, having at least the following steps:

controlling one or more radio frequency subsystems comprising at least one interface controller, from a digital baseband subsystem comprising an interface controller and an application (TS) and said method including at least a processing of following actions:

configuring one or more radio frequency subsystems and determining a specific anticipation time with which the application (TS) has to operate, synchronizing times between the digital baseband subsystem and the one or more radio frequency subsystems, transmitting, from the digital baseband subsystem and to a radio frequency subsystem, messages MSG(H, data) having the parameters indicating to the radio frequency subsystem, the processing operations to be performed, storing the message in the memory and, as soon as a duration of memory storage has finished, executing the message by configuring the radio frequency subsystem and by activating a content of the data of the message for the operation at a single antenna plane.

7. The method as claimed in claim 6, wherein on startup, the method involves at least the following steps:

a first phase for determining the delay time of the interface between the radio frequency subsystem and the digital baseband subsystem, a second phase of synchronization of the time $H_R$ of the radio frequency subsystem and the time $H_B$ of the digital baseband subsystem, a third phase, in which the digital baseband subsystem retrieves a minimum anticipation time used by the application TS for transmitting the time stamped messages from the digital baseband subsystem to the radio frequency subsystem, and a fourth phase, in which a latency between the digital baseband subsystem and the radio frequency subsystem is used to deduce a single minimum anticipation time that will be used by the digital baseband subsystem to control the radio frequency subsystem.

8. The method as claimed in claim 7, wherein it involves at least the following steps:

a first phase, in which a transmission/reception loop is implemented by executing the following steps, at a departure time t=H, H corresponds to the current value of $H_B$, the interface controller of the digital baseband subsystem sends a message MSG(request ($\tau$)) to the interface controller of the radio frequency subsystem in order to retrieve the time required by the radio frequency subsystem to produce a return message MSG($\tau$) that contains a transit time $D_I$ for replying, $\tau$ is the time for producing the return message MSG($\tau$), the departure time t and an arrival time t'=H+2$D_I$+$\tau$ of the transmission/reception loop are measured at the digital baseband subsystem in order to determine the transit time $D_I$, a second phase, in which the digital baseband subsystem transmits, at the time $H_B$, a message MSG(time set [$H_B$+$D_I$]) to the radio frequency subsystem containing the time $H_B$ increased by the transit time $D_I$, or the time $H_R$ increased by the transit time $D_I$, the necessary duration for routing the return message MSG($\tau$) to a time module at the radio frequency subsystem, a third phase, in which the application TS sends, with a message MSG(Config RF), all of the configurations and/or configuration information that is/are necessary for an operation of the application (TS) including a digital configuration and an analog configuration, in return, the radio frequency subsystem returns a message MSG($D_R$) and an anticipation duration $D_R$ necessary for processing the messages, the interface controller of the digital baseband subsystem then accumulates the anticipation durations $D_A$=$D_I$+$D_R$, and provides the anticipation value $D_A$ as a minimum duration for the application (TS) in order to converse with the radio frequency subsystem.

9. The method as claimed in claim 8, wherein, at a transmission, a message of IQ samples that is created by the digital baseband subsystem comprises a date indicating an instant of output of a first sample on the antenna plane, said date being deduced from the time $H_B$ of the digital baseband subsystem, time stamped commands being executed on the required date independent of a sequence of generation of said time stamped commands.

10. The method as claimed in claim 8, wherein, at a reception, a message of IQ samples that is created by the radio frequency subsystem comprises the date indicating an instant of consideration of a first sample on the antenna plane, said date being deduced from the real-time time $H_R$ of the radio frequency subsystem.

11. The method as claimed in claim 8, wherein a message for configuring the radio frequency subsystem, which said message is created by the digital baseband subsystem, comprises the date indicating an instant at which the radio frequency subsystem needs to be configured for incoming/outgoing samples, and the date is deduced from $H_B$ for the digital baseband subsystem.

12. The method as claimed in claim 8, wherein a control message created by the radio frequency subsystem comprises the date indicating an instant at which the measurements are taken, and the date is deduced from the real-time $H_R$ of the radio frequency subsystem.

* * * * *